US 9,987,760 B2

United States Patent
Zinser

(10) Patent No.: US 9,987,760 B2
(45) Date of Patent: Jun. 5, 2018

(54) MANUAL PLIERS

(71) Applicant: WEZAG GmbH Werkzeugfabrik, Stadtallendorf (DE)

(72) Inventor: Roman Zinser, Neustadt (DE)

(73) Assignee: WEZAG GMBH WERKZEUGFABRIK, Stadtallendorf (DE)

(*) Notice: Subject to any disclaimer, the term of this patent is extended or adjusted under 35 U.S.C. 154(b) by 78 days.

(21) Appl. No.: 15/291,688

(22) Filed: Oct. 12, 2016

(65) Prior Publication Data

US 2017/0113367 A1    Apr. 27, 2017

(30) Foreign Application Priority Data

Oct. 23, 2015   (EP) .................................... 15191264

(51) Int. Cl.
*B26D 3/16*        (2006.01)
*B26B 13/26*       (2006.01)
(Continued)

(52) U.S. Cl.
CPC .......... *B26D 3/169* (2013.01); *B23D 29/023* (2013.01); *B25B 7/08* (2013.01); *B25B 7/12* (2013.01);
(Continued)

(58) Field of Classification Search
CPC ........ B26D 3/169; B26D 3/16; B23D 29/023; B25B 7/08; B25B 7/12; B26B 13/26; H02G 1/005
(Continued)

(56) References Cited

U.S. PATENT DOCUMENTS 4,062,218 A * 12/1977 Wiener ................ B23D 29/023
                                                    72/409.1
5,184,404 A *  2/1993 Chen .................... B23D 29/023
                                                     30/249
(Continued)

FOREIGN PATENT DOCUMENTS

DE          90 10 931.7      1/1992
DE          43 03 180 C1     1/1994
(Continued)

Primary Examiner — Kenneth E. Peterson
Assistant Examiner — Nhat Chieu Do
(74) Attorney, Agent, or Firm — Thomas | Horstemeyer, LLP

(57) ABSTRACT

The invention relates to manual pliers (1) which comprise a fixed cutting jaw (26) and a movable cutting jaw (23). The manual pliers (1) comprise a first maximal opening position in which it is possible to run through a working stroke part caused by the closure of the hand levers (2). In the first maximal opening position the latching lever (16) and a pushing lever (19) engage with a toothing (32) of the movable cutting jaw (23). With the actuation of the latching lever (16) it is possible to transfer the manual pliers into a second maximal opening position in which the opening angle of the hand levers (2) is larger than in the first maximal opening position. In the second maximal opening position the latching lever (16) and the pushing lever (19) do not engage with the toothing (32) of the movable cutting jaw (23). For the definition of the two opening positions, two stops are used which are formed by the latching lever (16) and a swivel bolt of the latching lever (16).

11 Claims, 11 Drawing Sheets

(51) Int. Cl.
  *B23D 29/02*    (2006.01)
  *B25B 7/08*     (2006.01)
  *B25B 7/12*     (2006.01)
  *H02G 1/00*     (2006.01)

(52) U.S. Cl.
  CPC ............... *B26B 13/26* (2013.01); *B26D 3/16* (2013.01); *H02G 1/005* (2013.01)

(58) Field of Classification Search
  USPC ............ 30/92, 249–252, 96, 245, 244, 192, 30/98–99; 81/314; 72/409.1
  See application file for complete search history.

(56) References Cited

U.S. PATENT DOCUMENTS

| | | | |
|---|---|---|---|
| 5,218,768 A | | 6/1993 | Putsch et al. |
| 5,526,570 A | | 6/1996 | Beetz et al. |
| 6,154,966 A | * | 12/2000 | Kobayashi ........... B23D 29/023 30/250 |
| 6,766,581 B2 | * | 7/2004 | Nordlin ................ B23D 29/023 30/251 |
| 2004/0134073 A1 | * | 7/2004 | Kochi ....................... B25B 7/12 30/92 |

FOREIGN PATENT DOCUMENTS

| | | |
|---|---|---|
| DE | 199 40 408 A1 | 3/2000 |
| DE | 10 2012 101758 | 9/2013 |

\* cited by examiner

MANUAL PLIERS

CROSS REFERENCE TO RELATED APPLICATIONS

This application claims priority to co-pending European patent application No. EP 15 191 264.9 filed Oct. 23, 2015.

FIELD OF THE INVENTION

The present invention relates to manual pliers embodied as cutting pliers by which it is possible to cut or sever a workpiece as e.g. a cable.

SUMMARY OF THE INVENTION

With the novel invention, it is possible to improve manual pliers for cutting or severing workpieces (in particular workpieces as cables and the like) with respect to the operation under consideration of the demands for the components and the requirements for the constructional space.

According to the invention, the manual pliers comprise a fixed cutting jaw and a movable cutting jaw. For one example the cutting jaws comprise sickle- or spiral-shaped cutting edges and form a closed accommodation for a workpiece. Here, with the closing movement of the manual pliers the cross-sectional surface of the accommodation which is limited by the cutting jaws reduces which leads to a cutting of the workpiece.

The movable cutting jaw comprises a toothing. On the one hand it is possible to bring this toothing into engagement with a pushing lever. Upon manual actuation of a movable hand lever, the pushing lever is moved. Due to the engagement of the pushing lever into the toothing, the movement of the pushing lever causes a closing movement of the cutting jaws. Furthermore, it is possible to bring a latching lever into engagement with the toothing of the movable cutting jaw. This leads to a securing of a reached position of the cutting jaws. In this way, e.g. an elastic opening of the cutting jaws upon a reduction of the actuating forces applied upon the hand levers of the manual pliers can be avoided, or for a plurality of successive working stroke parts a reopening of the hand levers can be allowed without a coinciding opening movement of the cutting jaws.

According to the invention, the manual pliers comprise a first maximal opening position. This first maximal opening position defines a maximal opening angle of the hand levers for which the latching lever and/or the pushing lever engage with the toothing of the movable cutting jaw or for which the engagement can be brought about. The first maximal opening position in particular correlates to the maximal opening angle of the hand levers at the beginning of each working stroke part.

Additional to the first maximal opening position the manual pliers also comprise a second maximal opening position. In the second maximal opening position an opening angle of the hand levers is larger than in the first maximal opening position. Furthermore, in the second maximal opening position the latching lever and/or the pushing lever is/are not in engagement with the toothing of the movable cutting jaw. This leads to the consequence that—when effecting the second maximal opening position—a relative movement of the cutting jaws is possible which is not impeded by the engagement of the pushing lever and/or the latching lever into the toothing. The unblocked relative movement of the cutting jaws can on the one hand be used in order to manually pivot the cutting jaws (without a pivoting movement of the hand levers coinciding therewith) so that an accommodation limited by the cutting jaws results which has a maximal cross-sectional surface or the movable cutting jaw is even pivoted to an extent that the accommodation is not closed in circumferential direction by the cutting jaws but comprises an opening on one side. By the manual movement of the cutting jaws it is possible to generate an accommodation which provides that it is easy to insert the workpiece. If the workpiece has been introduced under the maintenance of the second maximal opening position, a manual movement of the cutting jaws (again without any change of the position of the hand levers) can be provided in a way such that the cross-sectional surface of the accommodation limited by the cutting jaw again reduces until the two cutting jaws contact the outer surface of the workpiece. In this partially closed position of the cutting jaws it is then possible to bring the first maximal opening position about so that the subsequent working stroke part directly starts with cutting jaws already contacting the outer surface of the workpiece. In this way an excess empty stroke is reduced or avoided. Accordingly, for the inventive manual pliers the operation is improved.

Furthermore, within the frame of the invention the afore mentioned opening positions are provided in a simple an advantageous way:

The first maximal opening position is defined by a stop which is formed by the latching lever. In the first maximal opening position the movable hand lever contacts this stop. Accordingly, the latching lever is used in a multifunctional way. On the other hand, in some cases it is possible that (by use of the pivoting degree of freedom of the latching lever) dependent on the position of the latching lever the afore mentioned stop for defining the first maximal opening position can be effective or not effective so that in the latter case a change to the second maximal opening position is allowed.

For the definition of the second maximal opening position also a stop is provided. This stop is formed by the latching lever itself or by a pivot joint of the latching lever, in particular a swivel bolt of the pivot joint. In the second maximal opening position the movable hand lever contacts this stop. Accordingly, the latching lever and in some cases also a pivot joint provide the two required stops and so define the two different maximal opening positions also in a reduced constructional space.

It can be intended that the first and/or second maximal opening position is/are maintained by the manual pliers also without holding forces applied by the user. In this case it is possible that a spring is provided in the manual pliers. The spring biases the hand lever into the respective opening position against an associated stop. For this purpose, different springs can be used. However, for one inventive embodiment the movable hand lever is in the first maximal opening position on the one hand and in the second maximal opening position on the other hand biased against the associated stop by one and the same opening spring. This leads to a compact design with a multifunctional use of the opening spring. It is even possible that this opening spring is also used for automatically transferring the hand levers back into the associated first maximal opening position (e.g. after having run through a plurality of working stroke parts when reducing the hand forces).

It is generally possible that the latching lever is manually actuated by an actuation means via a transmitting connection of any type. However, for a particular proposal of the invention in one of its end regions the latching lever integrally forms an actuation means. The actuation means protrudes from the pliers head so that the actuation means is accessible from the outside for the user for allowing a manipulation of the latching lever. In this way, further transmitting connections for actuating the latching levers are not required which also leads to direct actuation haptics.

It is generally possible that a handle of the movable hand lever and a latching lever are arranged in different half longitudinal planes of the manual pliers. However, for a preferred embodiment the invention proposes that the handle of the movable hand lever and the latching lever are arranged in one and the same half longitudinal plane of the manual pliers which leads to an improved design of the constructional space. This design also provides the option that it is not required to actuate the latching lever in a direction away from the handle (e.g. by a thumb of the hand gripping the hand lever) but to pivot the latching lever towards the hand lever which leads to a further improved operation.

It is generally possible that the latching lever engages the toothing of the movable cutting jaw in a pushing direction of the pushing lever behind the pushing lever. However, for another embodiment the invention proposes that the latching lever engages the toothing of the movable cutting jaw in the pushing direction of the pushing lever in front of the pushing lever.

For another embodiment of the inventive manual pliers the latching lever and the pushing lever are biased by an actuating spring towards the toothing of the movable cutting jaw. For this purpose, the spring bases of the actuating spring are supported at the latching lever and at the pushing lever. In this way the actuating spring can be used in a multifunctional way.

Additional to the actuating spring, also an opening spring can be provided which produces an opening force biasing the movable hand lever. This leads to the result that the stiffness and pretension of the actuating spring on the one hand and of the opening spring on the other hand can be dimensioned independent on each other. Accordingly, it is possible to design the pressing forces of the latching lever and the pushing lever into the toothing of the movable cutting jaw (and so also to design the latching forces that have to be overcome for the opening movement of the cutting jaws) independent on the design of the opening force which is caused by the opening spring and by which the hand levers are pressed away from each other. Here, it is also possible that increased actuating forces for the latching lever can be avoided as these might occur if the latching lever was also biased directly or indirectly by the opening spring so that it was required to apply increased forces for pivoting the latching lever.

For another inventive embodiment the stop by which the first maximal opening position is defined is formed by a front side of a lever part of the latching lever. This lever part additionally forms a lateral contact surface. In the second maximal opening position a contact surface of the movable hand lever contacts the lateral contact surface of the lever part. By the contact between the contact surfaces it can be provided that in the second maximal opening position a return pivoting movement of the latching lever due to the actuating spring is not possible so that there is no engagement of the latching lever into the toothing of the movable cutting jaw. If instead starting from the second maximal opening position the movable hand lever is (in some cases only slightly) moved in closing direction, the contact surface of the lever part slides along the contact surface of the movable hand lever until a positive form lock between the contact surfaces is eliminated. The latching lever is then able to engage into the toothing of the movable cutting jaw. A limitation is given by the first maximal opening position, and a working stroke part can be initiated. Preferably, the contact surface of the lever part is arranged concentrically to the pivot axis of the hand lever.

For the provision of the contact surface for the stop formed by the front side of the lever part of the latching lever on the one hand and for the provision of the contact surface for the lateral contact surface of the lever part of the latching lever, the movable hand lever might have any design with a recess or any other contour of the same. Preferably, for the inventive manual pliers the contact surface of the movable hand lever which defines the contact with the contact surface of the latching lever is formed by a protrusion of the movable hand lever.

Furthermore, it is possible that the latching lever builds a real lever with two lever parts. In this case the actuation means is located in the end region of the lever part facing away from the pivot joint. In the end region of the other lever part facing away from the pivot joint, a latching nose or latching toothing is formed.

However, for another inventive embodiment of the manual pliers a latching nose or latching toothing of the latching lever is arranged at a location between a pivot joint of the latching lever and the actuation means of the latching lever (in the same lever part). This leads to a very compact design. The lever part forming both the latching nose as well as the actuation means can be connected by the pivot joint of the latching lever to the lever part providing the stop. Here, the two lever parts e.g. form an angle of 70° to 110°, preferably 80° to 100°.

In order to allow a free movement of the cutting jaws into the second maximal opening position, it is required to disengage the pushing lever from the toothing of the movable cutting jaw. This might be done in any way. For one proposal of the invention, the pushing lever is disengaged from the toothing of the movable cutting jaw controlled by a movement of the movable hand lever on the way from the first maximal opening position to the second maximal opening position. This can e.g. be provided by a direct contact between the movable hand lever and the pushing lever so that on the way from the first maximal opening position to the second maximal opening position the movable hand lever takes the pushing lever "along". It is possible that for this purpose for an opening angle which is larger than the first maximal opening angle the pushing lever contacts (in particular with a protrusion) a stop fixed to the housing. In this case, the further pivoting movement of the movable hand lever in opening direction (due to the pivotable linkage of the pushing lever with the movable hand lever) leads to the desired pivoting movement of the pushing lever away from the toothing of the movable cutting jaw.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
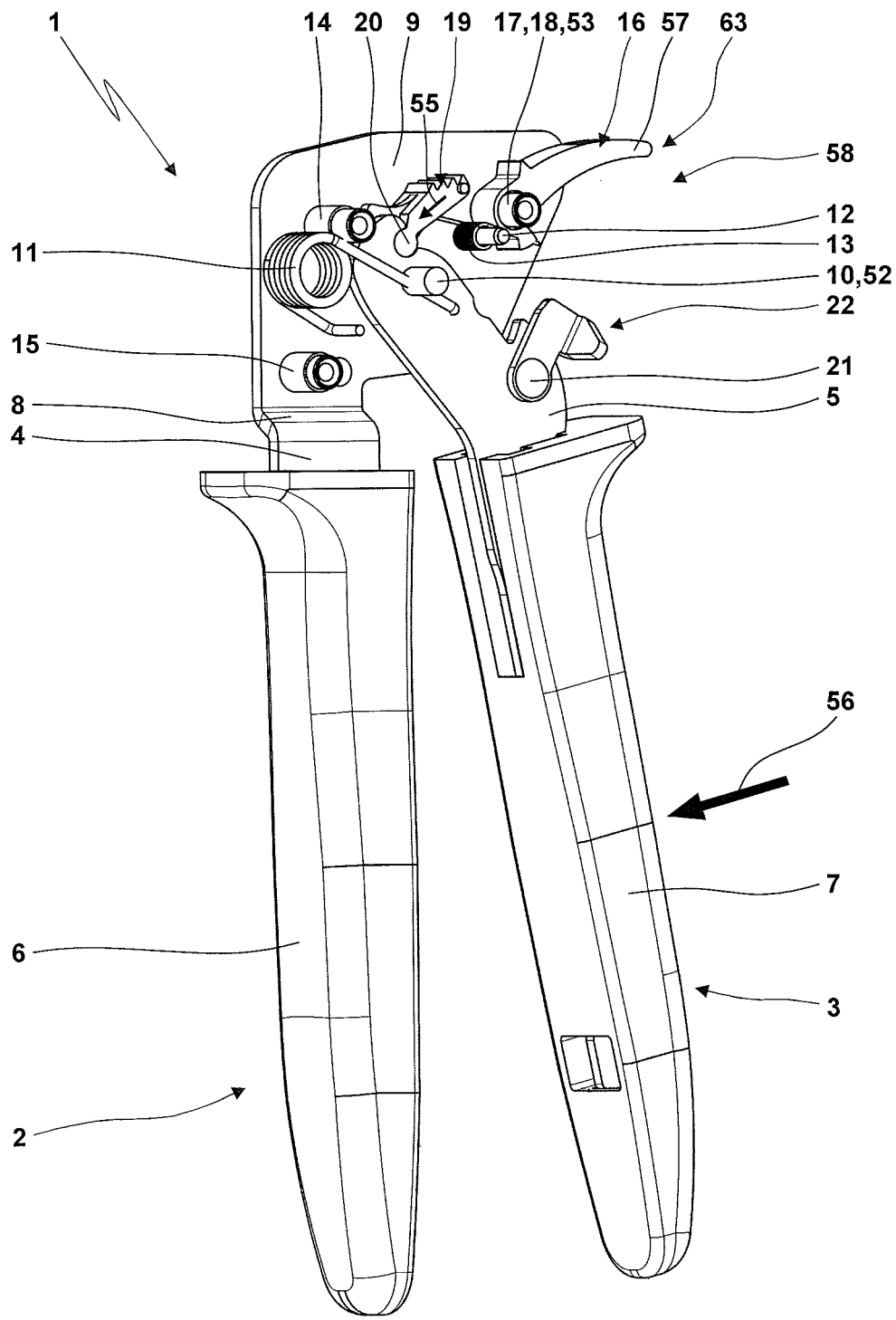
FIG. 1 shows manual pliers with disassembled pliers head module in a three-dimensional view.

FIG. 1 shows partially disassembled manual pliers 1 with a fixed hand lever 2 and a movable hand lever 3. The hand levers 2, 3 each comprise an elongate hand lever plate 4, 5.

In the region accessible for the user of the manual pliers 1 the hand lever plates 4, 5 are each covered by a preferably elastomeric handle 6, 7. The outer contour and the stiffness of the handles 6, 7 are optimized with respect to the actuating contact with the hand of the user. The hand lever plate 7 integrally continues via an offset or crank 8 to a housing plate 9. A pliers head plane is defined by the plane of extension of the housing plate 9. The housing plate 9 serves for pivotally supporting the movable hand lever 3 and the transmission elements of the driving transmission of the manual pliers 1 and for the provision of fixations for a pliers head module.

A swivel bolt 10 for the formation of a pivot joint 52 is held by the housing plate 9. By the swivel bolt 10 the movable hand lever 3 is pivotally supported by the housing plate 9 and so by the fixed hand lever 2. Additionally, an opening spring 11 (here a leg of a spiral spring or leg spring) is supported by the swivel bolt 10. The housing plate 9 carries a bolt 12 which extends through a actuating spring 13 (here also a spiral spring or leg spring). Furthermore, the housing plate 9 carries distance holders 14, 15 formed by stepped bolts or sleeves. A latching lever 16 is supported by a swivel bolt 17 for the provision of a pivot joint 53 for being pivoted relative to the housing plate 9. With stepped end regions protruding on both sides of the latching lever 16 the swivel bolt 17 at the same time forms another distance holder 18. By a pivot joint 20 a pushing lever 19 is pivotally mounted to the hand lever plate. The pivot joint 52 formed with the swivel bolt 10 is located between the pivot joint 20 for the support of the pushing lever 19 and the hand lever 7. For the shown embodiment, the pivot joint 20 is formed with a divided circular cutting of the hand lever plate 5 with a circumferential angle being slightly larger than 180°. An end region of the pushing lever 19 having the shape of a part of a cylinder is pressed or "clipsed" into the cutting.

By a pivot joint 21 a fixing lever 22 is linked to the hand lever 3. The pivot joint 21 is located between the handle 7 and the swivel bolt 10.

The hand lever 3, the fixing lever 22, the latching lever 16 and the pushing lever 19 can be pivoted about pivot axles being parallel to each other and having an orientation perpendicular to the pliers head plane. During a pivoting movement of this type the transmission elements or the hand lever plate 5, the latching lever 16 and the pushing lever 19 are at least partially guided by the housing plate 9. The opening spring 11 and the actuating spring 13 are biased by a torsional moment. The vector of the torsional moment also has an orientation vertical to the pliers head plane. In the partially disassembled state shown in FIG. 1 a part of the components or all of them can be held loosely by the housing plate 9 or can be held by the housing plate 9 in a loss-proof fashion.

Figure 2:
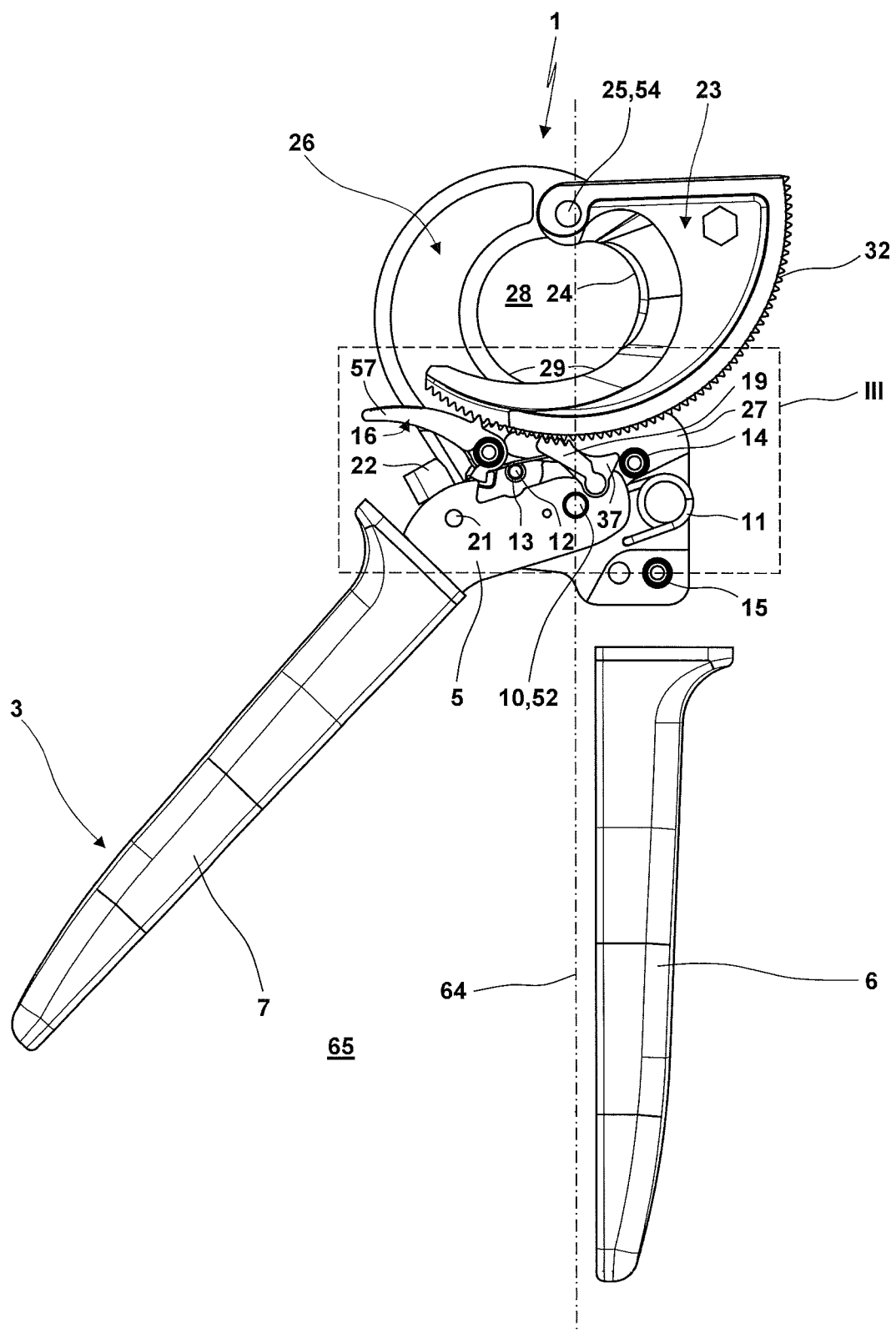
FIG. 2 shows a plan view of a pliers head plane of the manual pliers of FIG. 1, however with assembled pliers head module wherein a housing plate having an offset and a hand lever plate of a transmission module are not shown.

FIG. 2 shows the manual pliers 1 in another partially disassembled state. Here, the fixed hand lever 2 is only shown with its handle 6, whereas the hand lever plate 4 and the housing plate 9 are not shown. The movable cutting jaw 23 comprises an inner cutting edge 24 having (in a first rough approximation) a sickle-shape or partially spiral-shape and having an outer toothing 32 along a bow having the shape of a part of a circle. The movable cutting jaw 23 is linked by a pivot joint 25 (which is formed with a swivel bolt 54) to a fixed cutting jaw 26. The fixed cutting jaw 26 is formed integrally with a housing plate 27. Here, the housing plate 27 and the cutting jaws 23, 16 extend parallel to the pliers head plane with a pivoting movement of the movable cutting jaw 23 about a pivot axis defined by the pivot joint 25. Here, the pivot axis has an orientation perpendicular to the pliers head plane. The cutting jaws 23, 26 pass or cross each other with the smallest possible distance.

In the operational state shown in FIG. 2, the cutting jaws 23, 26 build an accommodation 28 for a workpiece which is to be cut by the manual pliers 1. The accommodation 28 is limited by the accommodation contour or cutting contour 29 formed by the cutting edge 24 of the movable cutting jaw 23 and of the fixed cutting jaw 26. The cross-sectional surface of the cutting contour 29 decreases during the working stroke of the manual pliers 1 and changes its geometry during the working stroke of the manual pliers 1.

Figure 3:
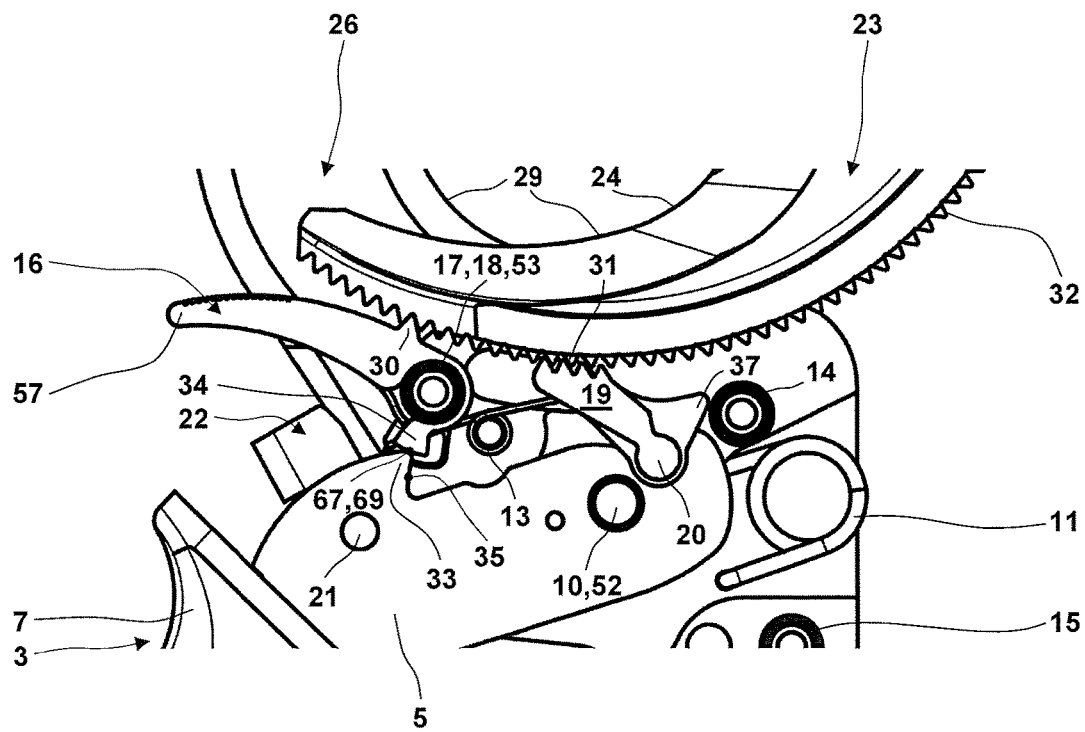
FIG. 3 shows a detail III of the manual pliers of FIG. 2 at the beginning of a working stroke.
Figure 4:
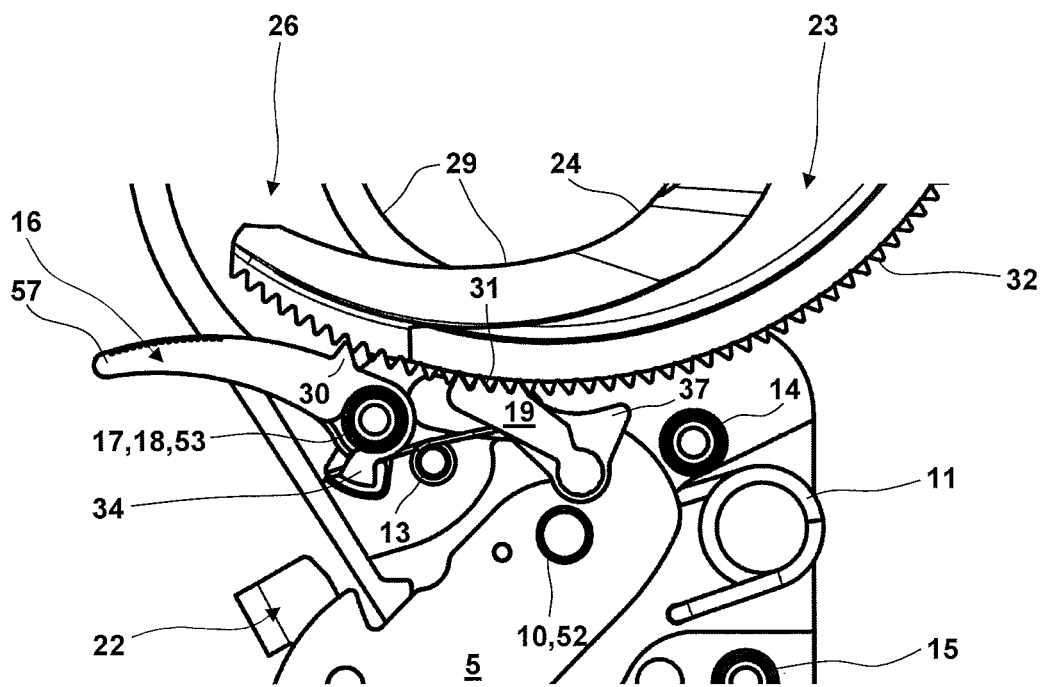
FIG. 4 shows the manual pliers in a detail according to FIG. 3 in a partially closed position during a first part of the working stroke.

FIG. 3 shows a detail III of FIG. 2. The manual pliers 1 are in a starting state. In the starting state it is possible to insert a workpiece (in particular a cable) into the accommodation 28. The latching lever 16 comprises a latching nose 30. The latching nose is latched with the toothing 32 of the movable cutting jaw 23 for latching the pivot position of the movable cutting jaw 23. In the end region facing away from the pivot joint 20 the pushing lever 19 comprises a toothing 31 which engages with the toothing 32 of the movable cutting jaw 23 (cp. FIG. 2). The first maximal opening position of the hand levers 2, 3 is (despite of the bias of the movable hand lever 3 by the opening spring 11 in outer direction) defined by the contact of a nose or a protrusion 33 of the hand lever plate 5 with an angular offset or bending (being L-shaped in a first rough approximation) or contacts with a lever part 34 of the latching lever 16. In the first maximal opening position according to FIGS. 2 and 3 the latching nose 30 of the latching lever 16 as well as the toothing 31 of the pushing lever 19 engage the toothing 32 of the cutting jaw 23.

Upon application of actuating forces to the hand levers 2, 3, the hand levers 2, 3 are moved towards each other in a first part of the working stroke. This has the consequence that by the engagement with the toothings 31, 32 the pushing lever 19 applies a closing force upon the movable cutting jaw 23. The closing force comprises a component having an orientation in circumferential direction and in closing direction around the pivot axis of the pivot joint 25. Accordingly, a partial closure of the cutting jaws 23, 26 with a reduction of the cross-sectional surface of the cutting contour 29 will be caused. In this way, a partial cutting of the workpiece which is located in the accommodation 28 is provided. During the closing movement of the movable cutting jaw 23, the latching lever 16 is able to move elastically in outer direction. The latching nose 30 slides (dependent on the extent of the movement of the movable cutting jaw 23) over the toothing 32 with successive engagements into the passed intermediate tooth spaces of the toothing 32. If instead the closing actuating forces are reduced and removed and instead the hand levers 2, 3 are again opened for a further part of the working stroke of the manual pliers 1 with the engagement of the latching nose 30 of the latching lever 16 into the last reached intermediate space between the adjacent tooth of the toothing 32, a previously reached closing position of the cutting jaws 23, 26 is secured. During this opening movement, the pushing lever 19 is able to move elastically and the toothing 32 of the pushing lever 19 is able to slide over the toothing 32 of the movable cutting jaw 23. In this way, during the opening movement the point of engagement of the toothing 32 of the pushing lever 19 with the toothing 32 of the cutting jaw 23 changes. Then, for the next part of the working stroke, the hand levers 2, 3 are again closed. With this closing movement (corresponding to the explanation of the previous part of the working stroke) the pushing lever 19 is able to cause a further closure of the cutting jaws 23, 26 with a sliding movement of the latching nose 30 of the latching lever 16 over the toothing 32. A plurality of working strokes of this type will then be successively provided until the cutting contour has been completely closed so that the workpiece is completely cut.

Figure 5:
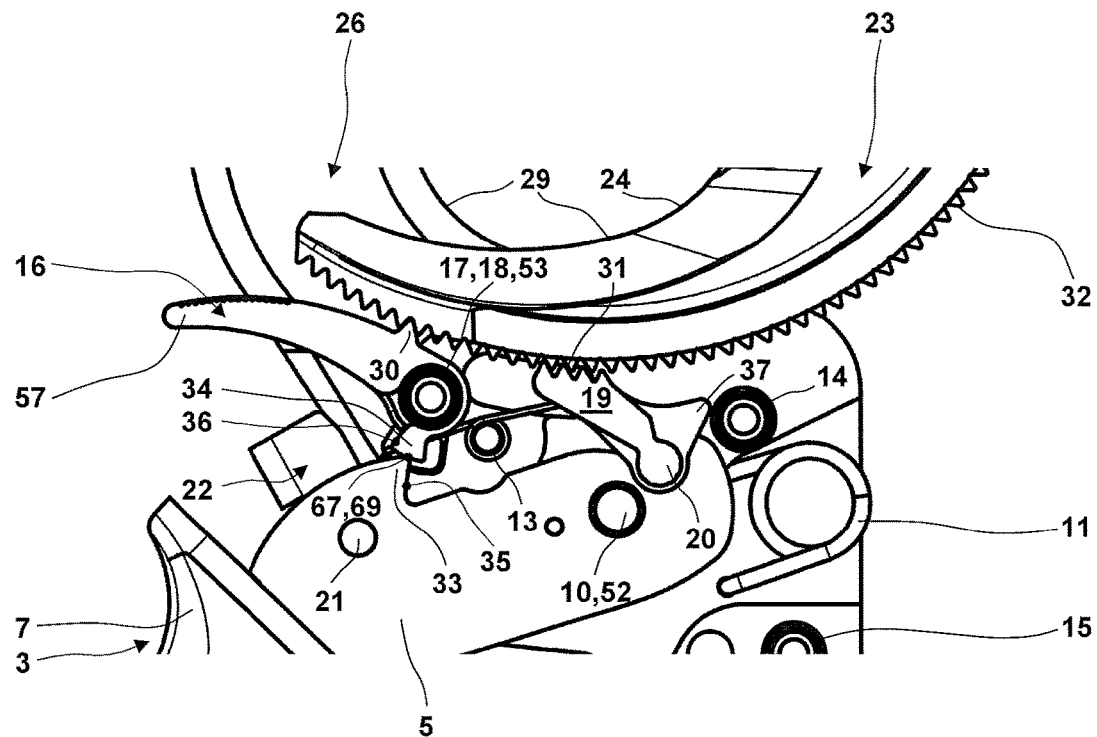
FIG. 5 shows the manual pliers in a detail corresponding to FIGS. 3 and 4 for a reopening of the hand levers after the first part of the working stroke.

If despite of the application of high actuating forces upon the hand levers 2, 3 it is not possible to completely cut the workpiece, it may be required to interrupt the actuation process before running completely through the working stroke. Due to the extensive compression of the workpiece, the interruption of the actuation in the beginning leads to an elastic opening movement of the cutting jaws 23, 26. During this elastic opening movement the toothing 31 of the pushing lever 19 will be able to slide along the toothing 32. However, an opening movement of this type is not allowed by the latching lever 16 (or dependent on the position of the latching nose 30 relative to the toothing 32 only permitted to a limited extent). The latching nose 30 of the latching lever 16 engages in a blocking fashion into the toothing 32 of the cutting jaw 23 so that a continuation of the elastic opening movement of the cutting jaws 23, 26 is not allowed. Due to the in some circumstances large pressing force between the latching nose and the toothing 32 caused by the elastic expansion of the workpiece, it is possible that a simple manual actuation of the latching lever 16 in opening direction for allowing a further opening of the cutting jaws 23, 26 and for allowing a removal of the partially cut workpiece is not possible. This situation is shown in FIG. 5 with the release of the toothing 31 of the pushing lever 19 from the toothing 32 of the movable cutting jaw 23 but the engagement of the latching nose 30 of the latching lever 16 with the toothing 32 of the cutting jaw 23.

Figure 6:
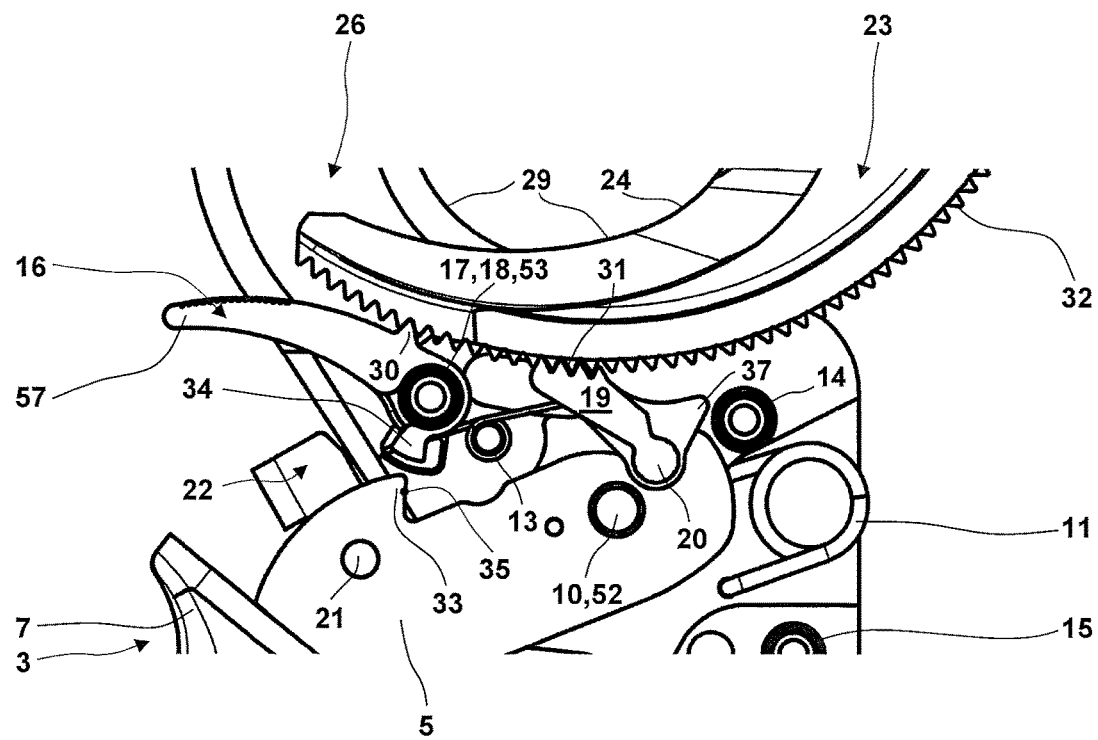
FIG. 6 shows the manual pliers in a detail corresponding to FIGS. 3 to 5 for the interruption or termination of a working stroke with a release of the latching lever by a provision of a small closing movement.
Figure 7:
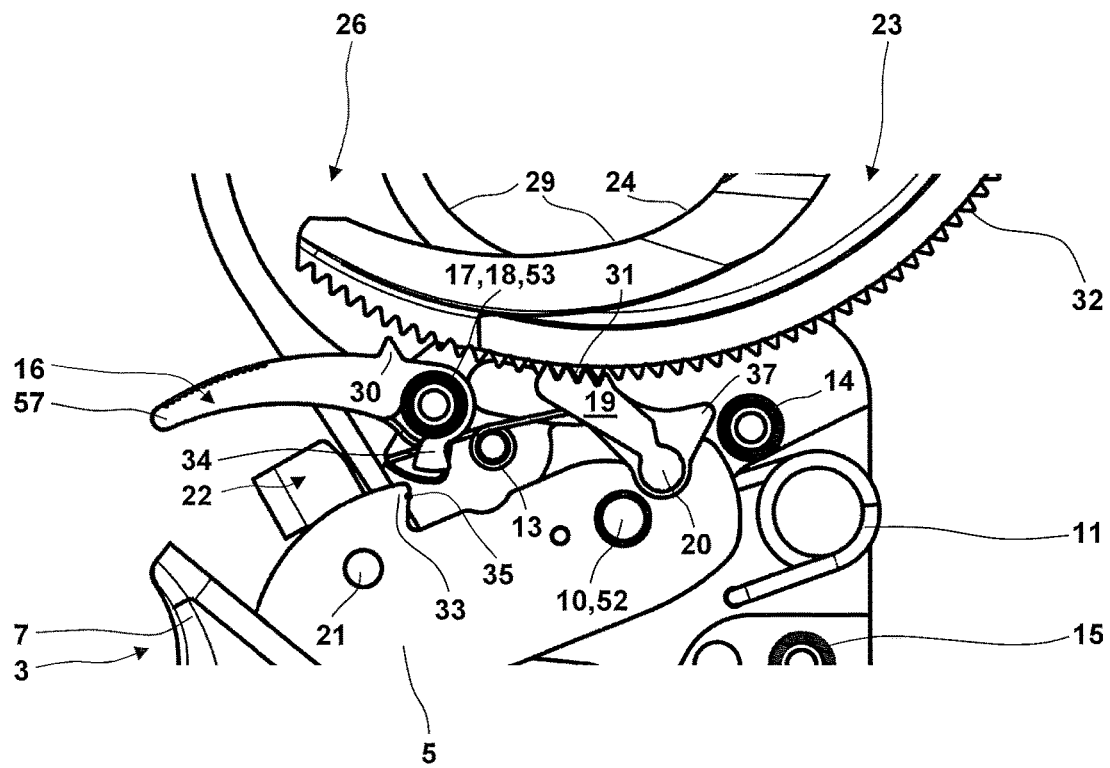
FIG. 7 shows the manual pliers in a detail corresponding to FIGS. 3 to 6 for a manual pivoting of the latching lever out of engagement with a toothing of a movable cutting jaw for allowing an opening movement.

In order to allow the release of the latching lever 16 and the further opening of the cutting jaws 23, 26, according to FIG. 6 the hand levers 2, 3 will be slightly closed with the result of another elastic compression of the workpiece. This closure has the consequence that the pushing lever 19 again engages with its toothing 31 with the toothing 32 of the cutting jaw 23. With an increase of the actuating force transferred by the pushing lever 19 to the cutting jaw 23, the contact between the latching nose 30 of the latching lever 16 and the toothing 32 of the cutting jaw 23 will be relieved so that it is also possible to manually release the latching lever 16 by a pivoting movement of the same away from the toothing 32 (FIG. 7). Accordingly, for actuated latching lever 16 it is possible to open the cutting jaws 23, 26 so that it is possible to remove the workpiece.

For the opening of the hand levers 2, 3 the maximal opening position is not defined by the contact of the protrusion 33 of the hand lever plate 5 with the lever part 34 of the latching lever 16. Instead, for actuated latching lever 16 the protrusion 33 is able to pass the lever part 34 with the opening movement of the hand lever 3. Accordingly, a second maximal opening angle is allowed which is larger than the first maximal opening angle of FIG. 3. In the second maximal opening position the protrusion 33 of the hand lever plate 5 engages behind the lever part 34. Via the protrusion 33 the opening spring 11 biases the hand lever part 34 in opening direction of the latching lever 16 so that in the second maximal opening position also the latching lever 16 is secured in a position in which the latching nose 30 of the latching lever 16 does not engage with the toothing 32 of the cutting jaw 23. In this second maximal opening position it is possible to insert a new workpiece into the accommodation 28. Here, it is also possible that the cutting jaws 23, 26 are manually closed over a stroke part until the cutting jaws 23, 26 get into contact with the outer surface of the new workpiece.

When starting from the second maximal opening position, with a small closure of the hand levers 2, 3 the contact surface 35 of the protrusion 33 slides along the associated contact surface 33 of the lever part 34 in a direction away from the swivel bolt 17. Here, the friction force between the contact surface 35 and the contact surface 36 only depends on the force of the actuating spring 13. Preferably, for the provision of the mentioned sliding movement between the contact surfaces 35, 36 without a simultaneous considerable pivoting movement of the latching lever 16, the contact surface 35 is shaped concentrically to the pivot axis of the pivot joint 52. If at the end of the sliding movement the protrusion 33 and the lever part 34 do not engage each other, the actuating force 16 comes into effect by pivoting the latching lever 16 towards the tooting 32 for the provision of the engagement of the latching nose 30. At the same time, the outer front side 69 of the lever part 34 (again) forms a stop 67 for the protrusion 33 for limiting the opening position of the hand levers 2, 3 to the first maximal opening position.

It is possible that with the movement of the hand lever 3 into the second maximal opening position it is not only the latching lever 16 which is pivoted away from the toothing 32. Instead, corresponding to FIG. 8, in the stroke part from the normal maximal opening position to the extended maximal opening position a protrusion 37 of the pushing lever 19 might come into contact with a contact surface which is not moved during the pivoting movement of the hand lever 3. For the shown embodiment, this contact surface is formed by the distance holder 14. With the provision of the contact between the protrusion 37 and the distance holder 14 the further pivoting movement of the hand lever 3 in opening direction (so in FIG. 8 in clockwise direction) leads to the result that (due to the contact of the protrusion 37 with the distance holder 14) the protrusion 37 and so the pushing lever 19 are pivoted in opposite direction (so in counter-clockwise direction) so that the pushing lever 19 is pivoted away from the toothing 32. In the extended opening position according to FIG. 8 (which is automatically maintained due to the bias of the hand levers 2, 3 by the opening spring 11) both the latching lever 16 as well as the pushing lever 19 are in a secured position. In the secured position the latching lever 16 and the pushing lever 19 do not engage the toothing 32 of the cutting jaw 23. Accordingly, it is possible to freely pivot the cutting jaw 23. This free pivoting movement can be used for manually pivoting the cutting jaws towards each other after inserting the workpiece into the maximally opened cutting jaws 23, 26 until the cutting jaws contact the outer surface of the workpiece. Only in this position the hand levers 2, 3 are actuated with the provision of the engagement of the latching lever 16 and/or the pushing lever 19 into the toothing 32 of the cutting jaw 23. This leads to the advantage that at the beginning of the actual working stroke of the manual pliers 1 there is no empty stroke with a closure of the hand levers 2, 3 until the cutting jaws 23, 26 contact the outer surface of the workpiece so that the number of working stroke parts required will be reduced.

If the hand levers 2, 3 have been closed, it is possible to pivot the fixing lever 22 about the pivot joint 21 in inner direction so that the fixing lever 22 engages into a recess of the cutting jaw 23 (here not shown) with a positive form lock for fixing the position of the hand lever 3. This might lead to advantages as a compact storage of the manual pliers with closed hand levers 2, 3 (e.g. in a tool box).

Figure 8:
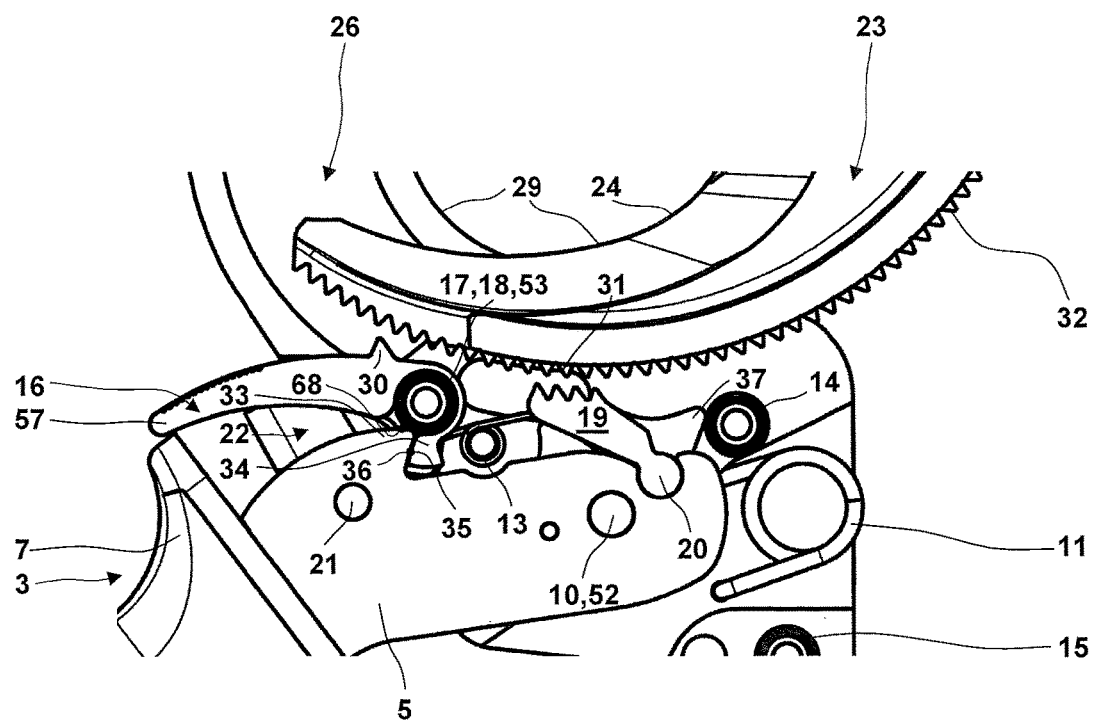
FIG. 8 shows the manual pliers in a detail corresponding to FIGS. 3 to 7 in a second maximal opening position.

Depending on whether
  there is a driving coupling of the hand levers 2, 3 to the cutting jaws 23, 26, there is a limitation of the first maximal opening position (cp. FIG. 3), there is an engagement of the latching nose 30 of the latching lever 16 with the toothing 32 of the cutting jaw and/or the latching lever 16 has not been manually actuated (in the following "operating position") or
  there is no driving coupling of the hand levers 2, 3 with the cutting jaws 23, 26, there is a limitation to the second maximal opening position (cp. FIG. 8), there is no engagement of the latching nose 30 of the latching lever 16, of the toothing 31 of the pushing lever 19 with the toothing 32 of the cutting jaw and/or the latching lever 16 has been actuated manually (in the following "loading and removal position"),
different stops 67, 68 and contact surfaces for the hand lever plate 5 may become effective:
  In the loading and removal position the opening spring 11 presses the hand lever 3 with the contact surface 34 of the protrusion 33 against the contact surface 36 of the lever part 34. It is also possible that with its front face the protrusion 33 contacts the swivel bolt 17 or distance holder 18 so that the swivel bolt 17 forms a stop 68. In this way, the loading and removal position or the second maximal opening position is defined.
  Instead, in the operating position at the beginning of the working process the opening spring 11 presses the protrusion 33 of the hand lever 3 against the outer front surface 69 of the lever part 34 so that there is a limitation to the first maximal opening angle.

For manual pliers according to the prior art (cp. e.g. DE 43 03 180 C1), the closure of the hand levers is provided by a movement of the movable hand lever in clockwise direction leading to an actuation of the movable cutting jaw in the same direction, so here also in the clockwise direction. Instead, for the embodiment shown here, the movement of the movable hand lever 3 in clockwise direction leads to a simultaneous movement of the movable cutting jaw 23 in counter-clockwise direction. This is the case because for the above mentioned prior art the pivot joint for the pushing lever 19 is located between the pivot joint 10 for the linkage of the hand lever 3 and the handle 7. Instead, for the embodiment shown here, the pivot joint 10 for the linkage of the hand lever 3 is located between the pivot joint 20 for the linkage of the pushing lever 19 and the handle 7. This leads to the result that according to the prior art the pushing lever force component which is applied by the pushing lever 19 upon the toothing and which causes a moment about the pivot joint 52 has an orientation opposite to the actuating force component which is applied by the user upon the hand lever 3 and which is effective with respect to the pivot joint 52. Instead, for the embodiment shown here, the pushing lever force component 55 applied by the pushing lever 19 upon the toothing (which causes a moment with respect to the pivot joint 52) has the same direction as the actuating force component 56 which is applied by the user upon the hand lever and which has an effect with respect to the pivot joint 52. For the embodiment known from the prior art the movable hand lever forms only a pivot arm with respect to the pivot joint for the linkage of the movable hand lever to the fixed hand lever which is biased on the same side of the pivot joint both by the actuating force component as well as by the pushing lever force component are applied. Instead, for the shown embodiment the hand lever 3, respectively the hand lever plate 5 form lever parts on both sides of the pivot joint 52 wherein the pushing lever 19 is linked to one lever part so that the pushing lever force component 55 acts upon this lever part, whereas the actuating force component 56 is applied to the other lever part.

The latching lever 16 integrally and directly forms an actuation means 57 which is in particular an end region of the latching lever 16 which protrudes from the pliers head and which is accessible from the outside. Accordingly, here the unlatching of the latching lever 16 is not provided by another component and/or an interposed transmitting connection.

A spring base of the actuating spring 13 biases the pushing lever 19 towards the toothing of the movable cutting jaw 23. The other spring base of the actuating spring 13 biases the latching lever 16 towards the toothing 32 of the movable cutting jaw 23. Accordingly, the actuating spring 13 is used in a multifunctional way.

According to the invention, on the one hand the multifunctional actuating spring 13 is used for biasing both the latching lever 16 as well as the pushing lever 19 and on the other hand a separate opening spring 11 are used for biasing the hand levers 2, 3 in opening direction.

In the open position according to FIG. 3 the opening spring 11 causes a contact force by which the protrusion 33 is pressed towards the swivel bolt 17 to the outer front side 69 of the lever part 34 of the latching lever 16. Accordingly, the front side 69 of the lever part 34 forms a stop 67 for the hand lever 3 or the hand lever plate 5. For the provision of the loading and removal position (so an unlocking of the latching lever 16) the latching lever 16 is pivoted towards the handle 7, so away from the pliers head. Preferably, the pivoting movement for the unlocking of the latching lever 16 is provided by the thumb, whereas the other parts of the hand of the user further contact the hand lever 3 or even both of the hand levers 2, 3. The radial extension of the lever part 34 (so the distance of the radial outer front side 69 of the lever part 34 from the outer surface of the swivel bolt 17) defines the difference between the first maximal opening position and the second maximal opening position.

The movable cutting jaw 23 and the movable hand lever 3, respectively the hand lever plate 5 are preferably pivoted in the same plane which is located between the two housing plates 9, 27. Preferably, also the latching lever 16 and the pushing lever 19 are pivoted in this plane. For all of the possible pivoting angles of the hand lever plate 5 and for a viewing direction perpendicular to the pliers head plane there is no overlap of on the one hand the hand lever plate 5 and the components moved therewith and on the other hand of the movable cutting jaw 23.

In order to reduce the diversity of components, simplify the storage and simplify the manufacturing process, the manual pliers 1 are manufactured from modules or in a modular system. Here, the manual pliers 1 comprise a pliers head module 38, a transmission module 39 and at least one hand lever module 40.

The transmission module 39 comprises transmission elements as the latching lever 16, the pushing lever 19 and at least the part of the hand lever plate 5 forming the pivot joint 20, the distance holders 14, 15, 18 and/or the swivel bolts 10, 17 and/or the bolt 12. These elements can be held in a loss-proof fashion or only loosely linked before the connection of the transmission module 39 with other modules. The transition module 39 here does not have a design being closed on both sides of the pliers head plane. Instead, the transmission module 39 is only on one side limited by the housing plate 9, whereas the afore mentioned components of the transmission module 39 are freely accessible from the other side via an opening 63. Preferably, the distance holders 14, 15, 18, the bolt 12, the swivel bolt 10 and the swivel bolt 17 are only housed, born or held in one of their end regions in the housing plate 9, whereas the afore mentioned other components are supported by these components and the other end region of these components is freely accessible before the assembly of the pliers head module 38.

Figure 9:
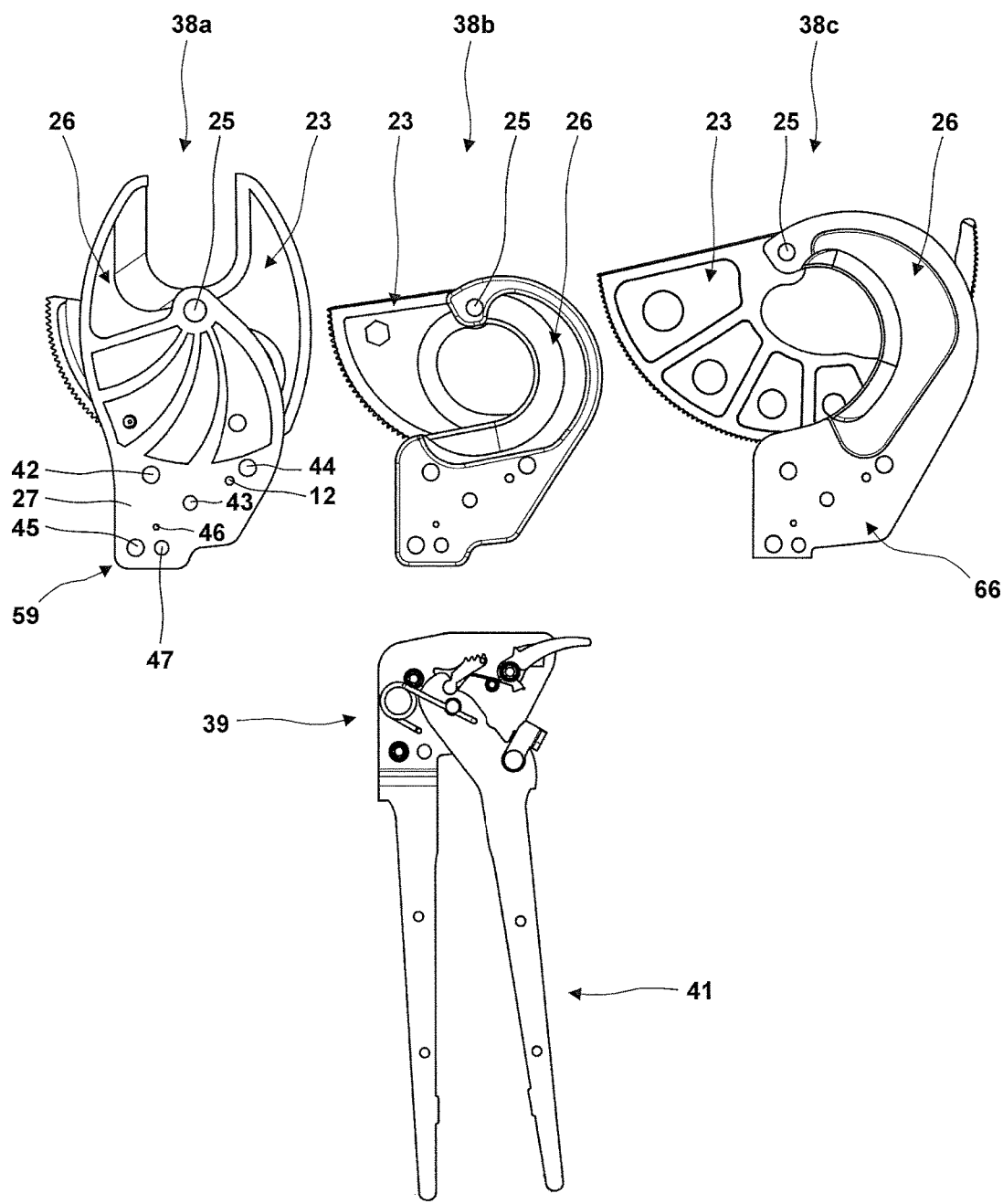
FIG. 9 shows a modular group of manual pliers which can be built with the same base modules and different pliers head modules.

According to FIG. 9, the transmission module 39 integrally forms also the hand lever plate 4. Also the hand lever plate 5 extends integrally into the transmission module 39 so that a base module 41 is formed. The base module 41 on the one hand provides the supporting elements for the handles 6, 7 and on the other hand provides the housing plate 9 and the components of the transmission module 39 held thereat.

According to FIG. 9, for the manufacturer it is possible to optionally combine the same base modules 41 with different pliers head modules 38*a*, 38*b*, 38*c*. For this purpose, there are no adaptations of the components of the transmission module 39 or the base module 41 required (in particular no changes of the shape or contours, no exchange of components and/or no adaptation of bore diameters or an adaptation of the pattern of drilling).

The pliers head module 38*a* is a so-called front-cutting pliers head module wherein the accommodation 28 formed by the cutting jaws 23, 26 is not closed in circumferential direction. Instead, here the accommodation 28 is open (e.g. U-shaped or V-shaped). In contrast, the pliers head modules 38*b*, 38*c* are looping, entangling or closed pliers head modules, wherein the cutting jaws 23, 26 delimit or define an accommodation 28 which is closed in circumferential direction at the beginning of the working stroke as well as during the whole working stroke. Here, the pliers head modules 38*b*, 38*c* differ in their size of the cutting jaws 23, 26, the formed accommodation 28, the cutting contour 29 and with respect to the workpieces and geometries of the workpieces that can be processed with these pliers head modules 38*b*, 38*c*.

According to FIG. 9, the pliers head modules 38*a*, 38*b*, 38*c* each comprise a housing plate 27 having the same bores at the same positions with the same relative pattern and the same diameters. As an example, these bores will be explained for the pliers head module 38*a*, wherein the same applies for the pliers head modules 38*b*, 38*c*:

A bore 42 serves for housing the distance holder 14. A bore 43 serves for housing the swivel bolt 10. A bore 44 serves for housing the swivel bolt 17 or distance holder 18, whereas an adjacent bore 45 serves for housing the bolt 12. Another bore 45 located in the lower end region of the housing plate serves for accommodating the distance holder 15. Another bore 46 serves for housing an end region of a spring base of the opening spring 11, here a leg of the spiral spring or leg spring.

For the assembly of the respective pliers head module 38*a*, 38*b*, 38*c*, the pliers head module 38*a*, 38*b*, 38*c* is approached to the base module 41 from the open side of the transmission module 39 with an orientation parallel to the housing plate 9 of the transmission module 39. In the end the end regions of the swivel bolt 17, the distance holder 18, bolt 12, swivel bolt 10, distance holder 14, the opening spring 11 and the distance holder 15 enter into the associated bores 42 to 46. A fixation can be provided by a crimping or additional securing measures (e.g. screwing, widening and the like). The end position of the housing plates 9, 27 with a defined distance of the housing plates 9, 27 from each other is defined by the distance holders 14, 15, 18. In any case, with the assembly of the housing plate 27 the components are caught or trapped in a loss-proof fashion between the housing plates 9, 27. Moved components are guided between the housing plates 9, 27, and the end regions of the swivel bolt 17, distance holders 18, bolts 12, swivel bolts 10, distance holders 14 and distance holders 15 are each held in a housing plate 9, 27.

Preferably, the housing plate 27 of the pliers head module 38 is equipped with an additional bore 47 which does not fulfill any function for the embodiment according to FIG. 9.

Figure 10:
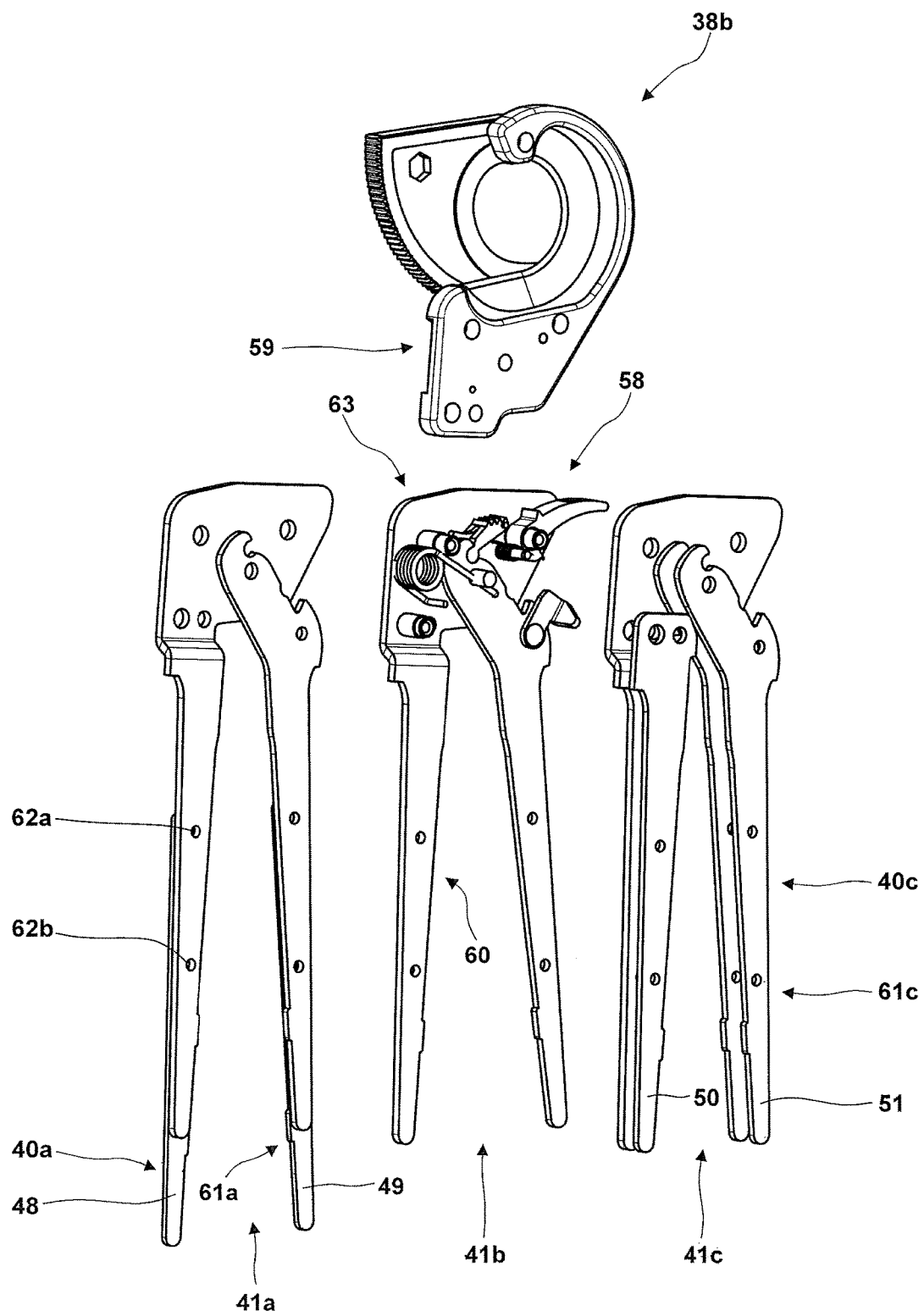
FIG. 10 shows a group of manual pliers which can be built with the same pliers head modules and the same transmission modules but different hand lever modules.

According to FIG. 10, it is possible to combine a pliers head module 38*b* (and in the same way also another pliers head module 38*a*, 38*c*) with different base modules 41, 41*b*, 41*c*. These base modules 41*a*, 41*b*, 41*c* preferably comprise identical transmission modules 39 and in particular identical housing plates 9 with identical bore patterns and bore diameters as well as identical transmission elements as latching lever 16 and pushing lever 19. In order to simplify the drawings, the distance holders, latching levers, pushing levers, swivel bolts and the different springs as well as the fixing lever are only shown for the base module 41*b* despite of the fact that these are also present at the base modules 41*a*, 41*c*.

Differing from the base module 41*b* the base module 41*a* comprises hand lever extensions 48, 49 which are plate-like extensions, which partially overlap the hand lever plates 4, 5 and which are connected to the hand lever plates 4, 5 (in particular by riveting, screwing, adhering and the like). Instead, for the base module 41*c* reinforcements 50, 51 are provided in the region of the hand levers 2, 3. In the region of the hand levers 2, 3 the reinforcements 50, 51 extend parallel to the hand lever plates 4, 5. The reinforcements 50, 51 are held with a defined distance by the hand lever plates 4, 5. For this purpose, in the end region facing towards the transmission module 39 the reinforcement 50 is supported via the distance holder 15 at the housing plate 9. Additionally, another distance holder is used (here not shown) which is housed in the bore 47 of the housing plate 27 and a corresponding bore of the reinforcement 50. An additional mounting (in particular screwing, riveting or adhering connection) can be provided in the region of the handles 2, 3 (in particular under use of additional distance holders). The corresponding applies for the connection between the reinforcement 51 to the hand lever plate 5. Also here a connection between the reinforcement 51 and the hand lever plate 5 might be provided by the swivel bolt 10 and a swivel bolt used for building the pivot joint 21.

Figure 11:
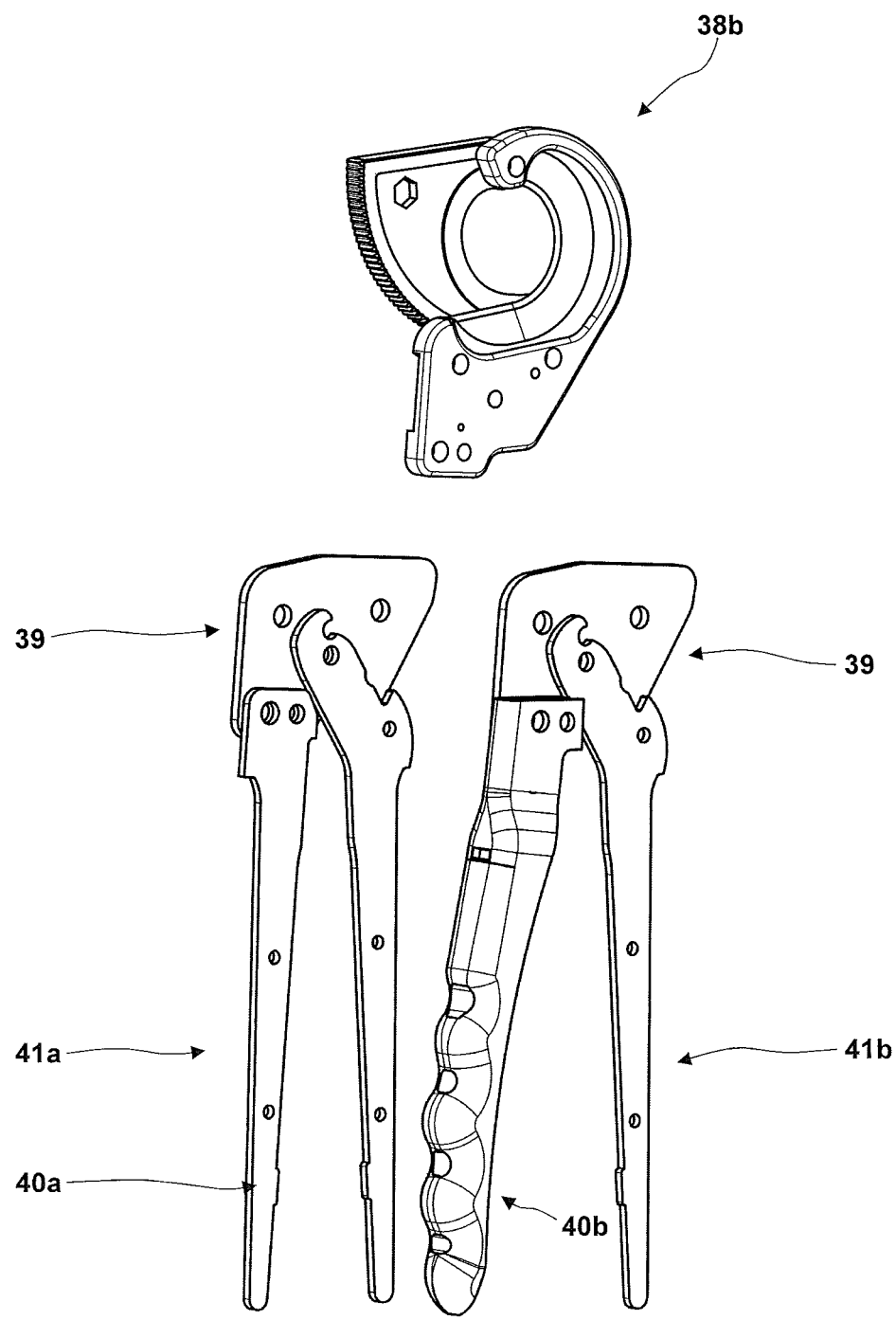
FIG. 11 shows another embodiment wherein different manual pliers are built with the same pliers head modules and the same transmission modules but different hand lever modules.

For the embodiments described above, the housing plate 9 and the hand lever plate 4 have an integral design. Instead, FIG. 11 shows an embodiment wherein the housing plate 9 and the hand lever plate 4 are formed separately from each other. The housing plate 9 is a component of the transmission module 39, whereas the hand lever plate 4 is a component of the hand lever module 40. Here, FIG. 11 shows different hand lever modules 40*a*, 40*b* which can optionally be connected to a transmission module 39. Also here the connection is provided both by the distance holder 15 as well as by an additional distance holder which extends through the bore 47. A base module 41 of this type formed with the hand lever module 40*a*, 40*b* and the transmission module 39 can optionally be assembled to a pliers head module 38*b* (or also 38*a*, 38*c*). The hand lever module 40*b* comprises a configuration which provides handle recesses for the fingers of the hand of the user of the manual pliers 1.

In the state disassembled from the pliers head module 38 the transmission module 39 comprises an interface 58 by which it is possible to mount the transmission module 39 to a corresponding counter-interface 59 of a pliers head module 38. Here the interface 58 is formed by the housing plate 27. The interface 58 of the transmission module 39 is preferably formed by the free end regions of the distance holders 14, 15, 18, the swivel bolt 10 and the bolt 12. Instead, the counter-interface 59 is formed with the bores 42 to 47. In a corresponding way the transmission modules 39 comprise interfaces 60 which can be coupled to identical counter-interfaces 61 of different hand lever modules 40*a*, 40*b*, 40*c*. Here, the interfaces 60 are formed by bores and/or the distance holder 15 and further bores 62 to which the hand lever modules 40*a*, 40*b*, 40*c* can be assembled.

Preferably, the housing plate 27 of the pliers head module 38 integrally forms the fixed cutting jaw 26. Preferably, the pliers head module 38 consists only of a base body 66 formed with the housing plate 27 and the fixed cutting jaw 26 (wherein the base body 66 preferably has a planar design), the movable cutting jaw 23 and the components required for the formation of the pivot joint 25. Preferably, the base body 36 which forms the cutting jaw 26 and the housing plate 27 is a precision casting part. Other components (in particular the hand lever plates 4, 5 with the housing plate 9) can be manufactured by punching.

For the embodiment of FIG. 10 generally the same manual pliers 1 can on the one hand be formed only with one single hand lever plate for each hand lever and on the other hand with doubled hand lever plates for each hand lever, wherein the last mentioned embodiment provides manual pliers 1 with increased stiffness and solidity.

In the plan view of FIG. 2 and in a view vertical to the pliers head plane the pivot joint 52 and the longitudinal axis 64 running therethrough divides the manual pliers 1 into a right half longitudinal plane and a left half longitudinal plane 65. The handle 7 of the movable hand lever 3 and the latching lever 16 including its bearing in the region of the pivot joint 53 are here arranged in the same half longitudinal plane 65. If the hand lever 3 is pivoted in clockwise direction for the opening of the hand levers 2, 3 in FIG. 3, this movement correlates with a pivoting movement of the latching lever 16 for the unlatching of the same from the toothing 32 in clockwise direction. The actuation means 57 of the latching lever 16 and the handle 7 of the movable hand lever 3 are located on the same side of the manual pliers 1.

Manual pliers 1 of the present type are also denoted as "ratchet cutters".

In the pushing direction of the pushing lever 19 the latching nose 30 of the latching lever 16 engages into the toothing 32 of the movable cutting jaw in a position in front of the pushing lever 19.

The latching lever 16 also comprises an elongate lever part additional to the lever part 34. The end region facing away from the pivot joint 53 of the elongate lever part forms the actuation means 57. The latching nose 30 is formed at this lever part in a position between the pivot joint 53 and the actuation means 57. This lever part forms approximately a right angle to the lever part 34.

For the shown embodiment the latching lever 16 comprises only one latching nose 30. For a modified embodiment the latching lever 16 comprises a latching toothing which engages the toothing 32 of the movable cutting jaw 23.

A transmission is interposed between the hand levers 2, 3 and the cutting jaws 23, 26. The transmission comprises the pushing lever 19 and the latching lever 16 which form transmission elements being located parallel to each other in the force flow. The transmission is laterally open. In the assembled state the transmission is limited transverse to the pliers head plane in a respective direction by a housing plate 9, 27. Instead, without assembled pliers head module 38 the transmission module 39 is limited in a direction transverse to the pliers head plane only in one single direction by the housing plate 9.

Many variations and modifications may be made to the preferred embodiments of the invention without departing substantially from the spirit and principles of the invention. All such modifications and variations are intended to be included herein within the scope of the present invention, as defined by the following claims.

I claim:

1. Manual pliers with a fixed cutting jaw and a movable cutting jaw comprising a toothing, wherein
   a) the toothing
      aa) engages with a pushing lever which is driven by a movable hand lever for generating a closing movement of the cutting jaws and
      ab) engages with a latching lever for securing a reached position of the movable cutting jaw,
   b) the manual pliers comprise
      ba) a first non-maximal opening position in which the latching lever and/or the pushing lever engage the toothing of the movable cutting jaw or can be brought into engagement with the toothing and
      bb) a second maximal opening position in which an opening angle of the hand levers is larger than in the first non-maximal opening position and in which the latching lever and/or the pushing lever cannot be engaged with the toothing of the movable cutting jaw,
   c) the first non-maximal opening position is defined by a first stop which is formed by the latching lever and which is contacted by the movable hand lever in the first non-maximal opening position and
   d) the second maximal opening position is defined by a second stop which is formed by the latching lever or by a pivot joint of the latching lever and which is contacted by the movable hand lever in the second maximal opening position.

2. The manual pliers of claim 1, wherein in the first non-maximal opening position and the second maximal opening position the movable hand lever is biased by one and the same opening spring against the respective stop.

3. The manual pliers of claim 1, wherein in an end region the latching lever forms an actuation means protruding from the pliers head.

4. The manual pliers of claim 3, wherein a latching nose or latching toothing of the latching lever is located between a pivot joint of the latching lever and the actuation means of the latching lever.

5. The manual pliers of claim 1, wherein a handle of the movable hand lever and the latching lever are arranged in one and the same half longitudinal plane of the manual pliers.

6. The manual pliers of claim 5, wherein the latching lever engages with the toothing of the movable cutting jaw in a position located in front of the pushing lever when seen in pushing direction of the pushing lever.

7. The manual pliers of claim 1, wherein the latching lever engages with the toothing of the movable cutting jaw in a position located in front of the pushing lever when seen in pushing direction of the pushing lever.

8. The manual pliers of claim 1, wherein
   a) the latching lever and the pushing lever are biased by an actuating spring towards the toothing of the movable cutting jaw and/or
   b) an opening spring produces an opening force biasing the movable hand lever.

9. The manual pliers of claim 1, wherein the first stop for defining the first non-maximal opening position is formed by a front side of a lever part of the latching lever and the lever part forms a lateral contact surface which is contacted by a contact surface of the movable hand lever in the second maximal opening position.

10. The manual pliers of claim 9, wherein a protrusion of the movable hand lever forms the contact surface.

11. The manual pliers of claim 1, wherein the pushing lever is disengaged from the toothing of the movable cutting jaw on the basis of a motion control by the movement of the movable hand lever from the first non-maximal opening position towards the second maximal opening position.

* * * * *